July 1, 1924. 1,499,810
A. EGG
NONPNEUMATIC TIRE
Filed Oct. 17, 1921
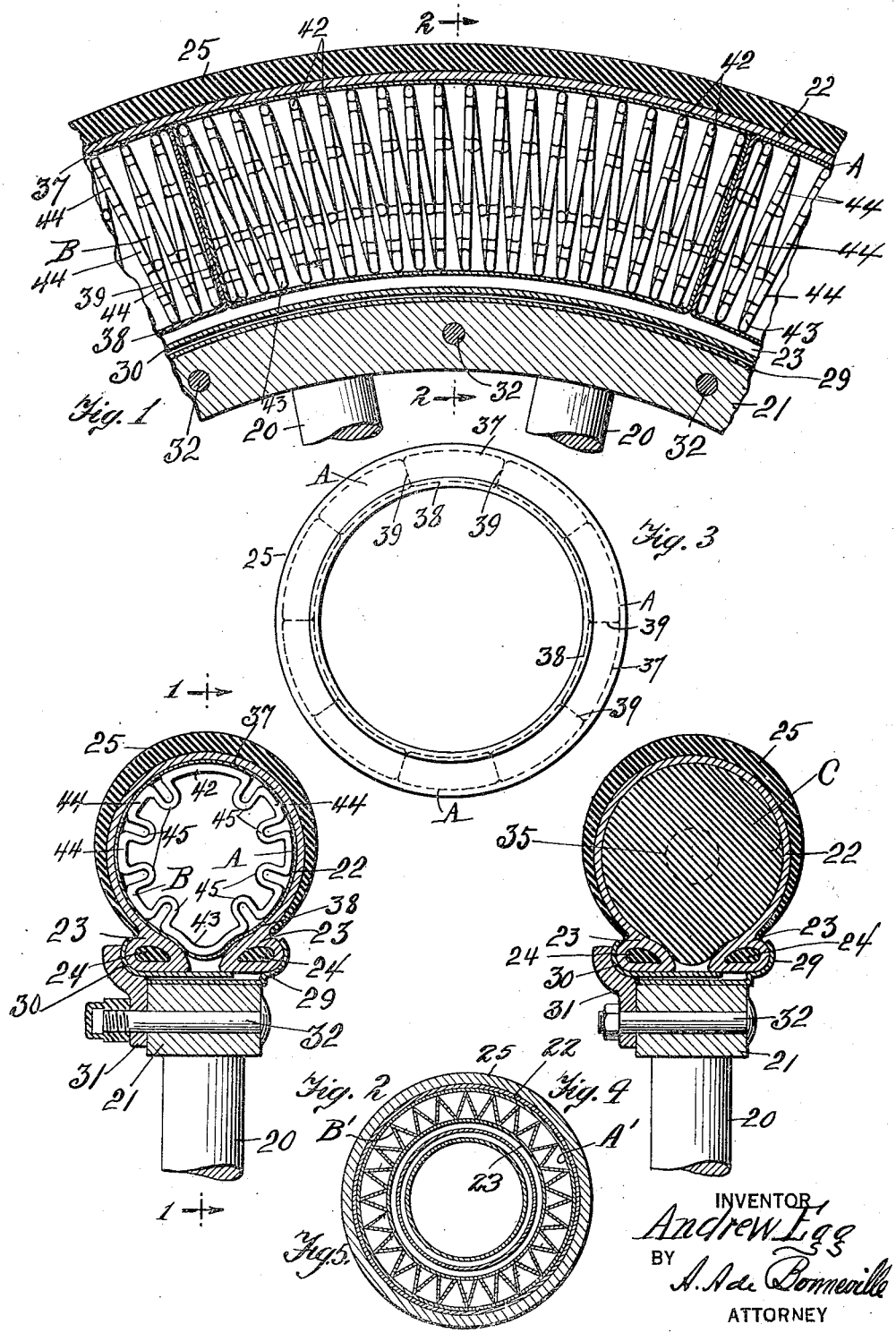
INVENTOR
Andrew Egg
BY A. A. de Bonneville
ATTORNEY Patented July 1, 1924.

1,499,810

UNITED STATES PATENT OFFICE.

ANDREW EGG, OF NEW YORK, N. Y.

NONPNEUMATIC TIRE.

Application filed October 17, 1921. Serial No. 508,342.

*To all whom it may concern:*

Be it known that I, ANDREW EGG, a citizen of the United States, and a resident of the borough of Manhattan, city of New York, in the county of New York and State of New York, have invented certain new and useful Improvements in Nonpneumatic Tires, of which the following is a specification.

This invention relates to a non-pneumatic tire. Its object is the production of a tire in which there is substituted a pliable element for the usual pneumatic inner tube. Another object of the invention is the production of a tire in which the flexible portion thereof that resists the strains and shocks to which it is subjected, will be practically as durable as the other portions of the tire.

A further object of the invention is to obviate the annoyances consequent to the use of an inner pneumatic tube due to its easy breakage when in use.

The organization of the invention comprises a shoe in which is inserted a plurality of sections of spiral springs to resist the strains to which the tire is subjected. The sections of springs consist of windings, and the latter each comprise circumferential portions that have interposed between them U shaped members. This combination of elements allows any portion of the windings to become depressed without injury when subjected to heavy loads or sudden strains.

In the drawings Fig. 1 represents a vertical section of the tire with a fragmentary portion of its wheel as on the line 1, 1 of Fig. 2; Fig. 2 shows a section of Fig. 1 on the line 2, 2; Fig. 3 indicates a side elevation of the tire on a reduced scale; Fig. 4 shows a section similar to Fig. 2 with a modification and Fig. 5 indicates a section similar to Fig. 1 with a modification.

A vehicle wheel is indicated with the spokes 20 and the felly 21. The shoe of the tire comprises the inner portion 22 of fabric. The edges of the portion 22 constitute the base portions 23 with the usual continuous strips of rubber 24. The tread of rubber is indicated at 25. The clamping ring of the tire comprises the stationary member 29 which is secured to the felly 21 and the movable member 30. A ring 31 bears against one face of the felly and is held in position by means of the clamping bolts 32, that extend through the felly 21. The member 29 bears against one of the base portions 23 of the tire and the member 30 bears against the other base portion 23. By means of the bolts 32 the base portions 23 are locked with the members 29 and 30 of the clamping ring, and the member 30 is held in place by means of the ring 31. Within the inner portion 22 of the shoe are located a plurality of bags A of canvas or other fabric or pliable material. The said bags A are each indicated with the top walls 37 and the bottom wall 38, that conform to the inner face of the inner portion 22 of the shoe. The end walls 39 of the said bags are located in radial planes that extend through the center of the wheel.

In each of the bags A is located a helical spring indicated in its entirety by the letter B. Each winding of the spring B comprises the circumferential crown portion 42 the circumferential base portion 43 and the circumferential side portions 44. The portions 44 are connected to each other and to said crown and base portions by the depending U-shaped connecting portions 45. The plurality of springs in this tire are curved to conform to the circumferential shape of the opening in the inner portion 22, and the ends of the bags A abut against each other.

In place of the plurality of springs B one spring of the form described may be inserted in the tire.

This modification is indicated in Fig. 5 which shows the inner portion 22 of the fabric of the shoe with the base portions 23. The tread of rubber is indicated at 25. Within the inner portion 22 of the shoe is located a bag $A^1$ of canvas or other fabric. In the bag $A^1$ is located a helical spring $B^1$ the windings of which are similar to the windings of the sections of springs B already described.

By means of the springs B the annoyance of an inner pneumatic tube is avoided. The main pressure of the tire is carried by the circumferential crown portions 42 of the springs and the side thrusts on the tire are taken up by the circumferential side portions 44. Easy compression of the springs is accomplished by the U shaped connecting portions 45, which also prevent any breakage of the springs when subjected to heavy loads and sudden shocks.

In the modification shown in Fig. 4 the wheel is again shown with the spokes 20, the felly 21. The shoe of the tire is indicated with the inner portion 22 having the base portions 23, and the tread 25. The clamping ring is indicated with the members 29 and 30. The ring 31 is shown with bolts 32 that extend through the felly 21. In place of the springs B there is substituted a pliable filler C of the sponge rubber, which may be made in sections, as in the case of the springs B, or may consist of one piece. The filler C conforms to the opening in the inner portion 22 of the tire, and may have an axial opening 35.

Various modifications may be made in the construction of the pliable element in the tire and the form shown and described is intended to be illustrative and not limitative of the invention.

Having described my invention what I desire to secure by Letters Patent and claim is:

1. In a tire of the character described the combination of a shoe, a plurality of bags inserted in the shoe and a spiral spring in each bag, the ends of the bags abutting against each other.

2. In a tire of the character described the combination of a shoe, a plurality of helical springs in the shoe, each winding of the springs consisting of a circumferential crown portion, a circumferential base portion, circumferential side portions and depending U shaped portions connecting the circumferential portions.

Signed at the borough of Manhattan, city of New York in the county of New York and State of New York this 1st day of October A. D. 1921.

ANDREW EGG.